United States Patent [19]
Hughes

[11] 3,902,137
[45] Aug. 26, 1975

[54] ELECTRO-OPTIC DIFFRACTION GRATING TUNED LASER

[75] Inventor: Richard Swart Hughes, China Lake, Calif.

[73] Assignee: The United States of America as represented by the Secretary of the Navy, Washington, D.C.

[22] Filed: Oct. 29, 1974

[21] Appl. No.: 518,313

[52] U.S. Cl. .................. 331/94.5 C; 331/94.5 K
[51] Int. Cl.² ........................................... H01S 3/10
[58] Field of Search .................. 331/94.5 C, 94.5 S Primary Examiner—Robert J. Webster
Attorney, Agent, or Firm—R. S. Sciascia; Roy Miller

[57] ABSTRACT

An electro-optic diffraction grating tuned laser comprising a laser medium, output mirror, retro-reflective grating and an electro-optic diffraction grating beam deflector positioned between the laser medium and the reflective diffraction grating.

An optional angle multiplier may be used between the electro-optic diffraction grating and the reflective grating.

5 Claims, 1 Drawing Figure

PATENTED AUG 26 1975

3,902,137

ELECTRO-OPTIC DIFFRACTION GRATING TUNED LASER

BACKGROUND OF THE INVENTION

Various attempts have been made to tune lasers including using rotatable diffraction gratings or electro mechnical devices such as rotating mirrors. However, the disadvantage in using any tuning system that has moving parts is the limitation of the operational frequency range.

CROSS REFERENCE TO RELATED APPLICATIONS

U.S. Pat. application Ser. No. 374,746 filed June 28, 1973 by R. S. Hughes, titled "Acousto-Optical Deflector Tuned Organic Dye Laser."

SUMMARY OF THE INVENTION

The invention comprises an electro-optic diffraction grating tuned laser which is capable of ultra rapid wavelength (frequency) tuning. The laser is rapidily tuned by utilizing an intracavity electro-optic diffraction grating beam deflector. The entire system comprises a laser cell, an output mirror at one side thereof in the path of the output laser beam, an electro-optic diffraction grating and a retro-reflective diffraction grating as the laser rear mirror. As an optional item, an angle multiplier may be included between the laser cell and the diffraction grating which acts as the laser rear mirror.

BRIEF DESCRIPTION OF THE DRAWINGS

The single FIGURE is an exploded schematic view of the system.

DESCRIPTION OF THE PREFERRED EMBODIMENT

Figure 1:
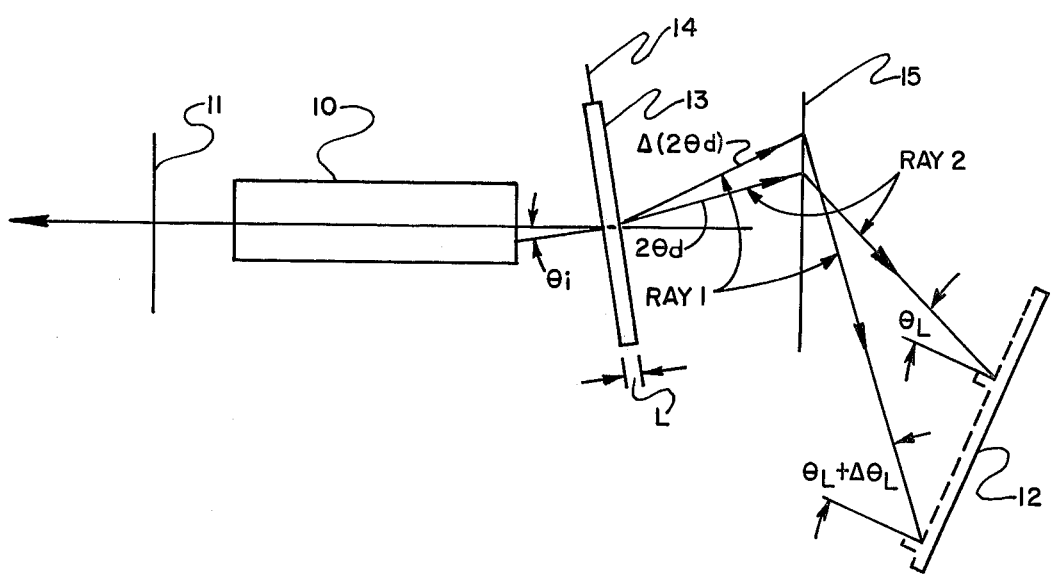

The system comprises a laser cell 10, output mirror 11, retro-reflective reflection diffraction grating 12 and electro-optic diffraction grating 13. A suitable signal is coupled in at 14 to the diffraction grating beam deflector 13. If desirable, an angle multiplier 15 (e.g., an inverted telescope) may also be used which is positioned between the electro-optic diffraction grating 13 and the reflection diffraction grating 12.

The electro-optic properties of certain crystals are such that a traveling microwave field within the crystal will induce a variation in the optical index of refraction within said crystal. This variation in the refractive index travels at the microwave phase velocity $C/V \overline{p\epsilon}$ and has the frequency of $\Omega$ or $2\Omega$ depending on whether the electro-optic effect is linear or quadratic with the microwave field. The variation in the refractive index may be considered to be a moving diffraction grating (analogous to acousto-optical diffraction gratings) and under appropriate conditions, energy from a light beam can be deflected into one or more orders of the grating. Such electro-optic diffraction gratings for light beam modulation and the theory incident thereto are set forth in the article "Electro-Optic Diffration Grating for Light Beam Modulation and Diffraction" by E. I. Gordon and M. G. Cohen, *IEEE Journal Quant. Elect.* QE-1 No. 5, pages 191–198, August 1965.

The design of the present laser system is virtually identical to that of the system set forth in co-pending U.S. patent application Ser. No. 374,746. However, because the laser described in the present invention makes use of the electro-optic effect, the system can be tuned approximately 100 times as fast.

The laser output mirror 11 has a broadband reflectivity and its reflectance should be optimized for optimum laser output. The reflectance will depend upon the laser material's gain, the pump pulse width and intensity, etc.

The laser cell 10 may be any one of which can support laser action in one of perhaps three modes: A. Single line; B. Multi line mode; and C. Continuously tunable mode. Laser materials capable of supporting these modes are well known in the art at this time.

The electro-optic diffraction grating 13 is a solid state crystal into which a strong microwave signal can be coupled, for example, $KTa_xNb_{1-x}O_3$.

Such gratings and the operation thereof are set forth in the article "Electro-Optic $[KTa_xNb_{1-x}O_3 \ (KTN)]$ for Light Beam Modulation and Deflection" by E. I. Gordon and M. G. Cohen. *Appl Phys Lett* 5 No. 9, pages 81–82, Nov. 1, 1964.

All of the diffracted (deflected) light can be contained in the first diffraction order if the parameters of cell thickness L, microwave frequency $\Omega$, optical frequency $\omega$ and microwave grating dielectric constant $\epsilon$ satisfy the following inequality $$L >> \frac{c}{2\pi\epsilon} \cdot \frac{\omega}{\Omega}$$

where $C$ is the velocity of light.

If the inequality is satisfied, the system is working in the Bragg regime and all of the deflected light appears in one beam.

The Raman-Nath regime is defined by the inequality $$L >> \frac{c}{2\pi\epsilon} \cdot \frac{\omega}{\Omega}$$

and does not appear to be useful in the present application in that for the Raman-Nath case, many diffracted orders appear.

The angle multiplier 15 may or may not be used depending on how large an optical bandwidth is required. Typically, an inverted telescope is used as an angle multiplier, however, other techniques may be used.

A plane reflection diffraction grating 12 is used as the wavelength selective laser rear mirror. The grating is used in the retroreflective mode where the angle of incidence as well as the angle of diffraction vary due to both a change in the wave length and the angle of incidence. For this case, the angular dispersion is one half that of the standard Littrow case and is given by $$\frac{d\theta}{d\lambda} = \frac{1}{\lambda} \tan \theta.$$

When the system is operating, the Bragg condition (i.e., the condition for constructive interference) must be satisfied. This condition is as follows:

$$2 \sin \theta_i = \frac{\lambda}{\Lambda} = \frac{\lambda\Omega}{\nu}.$$

Where $\theta_i$ is the angle of incidence upon the electro-optic grating, $\lambda$ is the optical wavelength and $\Lambda$, $\Omega$ and $v$ are the mircowave wavelength, frequency and velocity, respectively in the crystal 13. For small $\theta_i$ (in all cases $\theta_i$ is small) sin $\theta_i$ is approximately equal to $\theta_i$ and the following equality holds:

$$2\theta_i = \frac{\lambda}{\Lambda} = \frac{\lambda\Omega}{v}.$$

If the Bragg condition is satisfied, and a microwave signal is applied to the crystal, the intracavity beam will be deflected into RAY 1 of the FIGURE, and laser action will occur at a wavelength corresponding to the angle of incidence, $\theta_L$, on the reflection diffraction grating 12. As the microwave frequency is varied, the deflection angle varies (RAY 2) and the laser wavelength $\lambda$ is changed to that which is reflected at an angle of $\theta_L + \Delta\theta_L$ at the reflection diffraction grating 12. This process is stated mathematically in $$\Delta(2\theta_d) = \frac{\lambda\Delta\Omega}{v}\left[\frac{1}{1 - \frac{\Omega\lambda M}{v\tan\theta_L}}\right]$$

where $\Delta$ indicates the change and M is the multiplication factor of the angle multiplier. This rather lengthy equation replaces the usual deflector equation $$\Delta(2\theta_d) = \frac{\lambda}{v}\Delta\Omega$$

because in the present unique intracavity application, both the microwave and optical frequencies are changing simultaneously.

Thus, the laser wavelength can be changed rapidly simply by changing the microwave wavelength. This can be done very rapidly and the physical limit to the rapidity of tuning is set by the length of time it takes the microwave signal to travel across the width of the intracavity laser beam. For a microwave dielectric constant $\epsilon = 10^4$ and an intracavity laser beam width of 1 cm, the microwave transit time T is $$T = \frac{1 \text{ cm}}{3 \times 10^8 \text{ cm sec}^{-1}} \approx 3.3 \times 10^{-9} \text{ sec}.$$

Thus, tuning rates in excess of 100 MHz can be anticipated.

Through the use of the present invention, the laser medium 10 can support laser action in a single line mode, multi-line mode, and continuously tunable mode as previously set forth. In the single line mode, that is for a pulsed laser, the present tuning technique becomes an effective Q-switch. The Q-switching times are very rapid $\approx$ 10nsec. For a single line CW laser one would also have an effective modulator. In fact, an excellent and efficient modulator is provided for with 100 percent amplitude modulation at a frequency $\approx 10^9$ Hz.

In the multi-line mode, one could step tune, in wavelength, the laser output.

Further, in a continuously tunable mode, for instance as one would have with an organic dye laser, the wavelength (frequency) could be continuously varied at very rapid rates.

What is claimed is:
1. A wavelength tuned laser comprising;
an active laser medium,
means for pumping said medium for producing a population inversion therein;
resonator means positioned about said medium for stimulating a beam of radiation from said medium,
said resonator means comprising a partially reflective output coupling reflector located adjacent one end of said medium and a diffractive retroreflector adjacent the opposite end of said medium,
an electro-optic diffraction means positioned between said diffractive retroreflector and said medium,
modulating means coupled to said electro-optic means for setting up a diffraction pattern therein for deflecting said beam across the face of said diffractive retroreflector.

2. A wavelength tuned laser as set forth in claim 1 wherein:
said reflecting means is a reflecting reflective diffraction grating.

3. A wave length tuned laser as set forth in claim 1 wherein;
said electro-optical diffraction means comprises an electro-optical diffraction grating beam deflector.

4. A wavelength tuned laser as set forth in claim 1 and further including:
means positioned between said electro-optic diffraction means and said reflecting means for increasing the angular diffraction of the beam.

5. A wavelength tuned laser as set forth in claim 4 wherein said means comprises:
an angle multiplier lens system.

* * * * *